United States Patent
Stitt

(10) Patent No.: US 6,439,557 B1
(45) Date of Patent: Aug. 27, 2002

(54) THERMAL ISOLATOR FOR VEHICLE MOUNT

(75) Inventor: John B. Stitt, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/754,501

(22) Filed: Jan. 3, 2001

(51) Int. Cl.⁷ ................................................. F16F 7/00
(52) U.S. Cl. ................... 267/141; 267/140.11; 248/634
(58) Field of Search ........................... 267/141, 140.11, 267/140.13, 140.2–140.5, 141.1, 141.2, 141.3–141.7; 248/634, 635, 638, 649, 674; 29/700, 284, 896.93

(56) References Cited

U.S. PATENT DOCUMENTS

| | | | | |
|---|---|---|---|---|
| 1,855,769 A | * | 4/1932 | Paton ........................ | 248/635 |
| 5,295,652 A | * | 3/1994 | Byrne ........................ | 16/2.1 |
| 5,330,163 A | * | 7/1994 | Bodin et al. ........... | 267/140.13 |
| 5,335,893 A | * | 8/1994 | Opp ........................... | 248/632 |
| 5,722,631 A | * | 3/1998 | Dorton ...................... | 248/632 |
| 5,788,206 A | * | 8/1998 | Bunker ...................... | 248/634 |
| 5,788,207 A | * | 8/1998 | Bunker ...................... | 248/634 |

* cited by examiner

Primary Examiner—Pam Rodriguez
(74) Attorney, Agent, or Firm—Scott A. McBain

(57) ABSTRACT

A thermal isolator including first and second pads, the first and second pads shaped to cover first and second leg portions of a mount. The isolator further includes a friable connecting portion attached to each of the first and second pads. The connecting portion is positioned to disconnect when a housing is positioned on the mount.

20 Claims, 1 Drawing Sheet

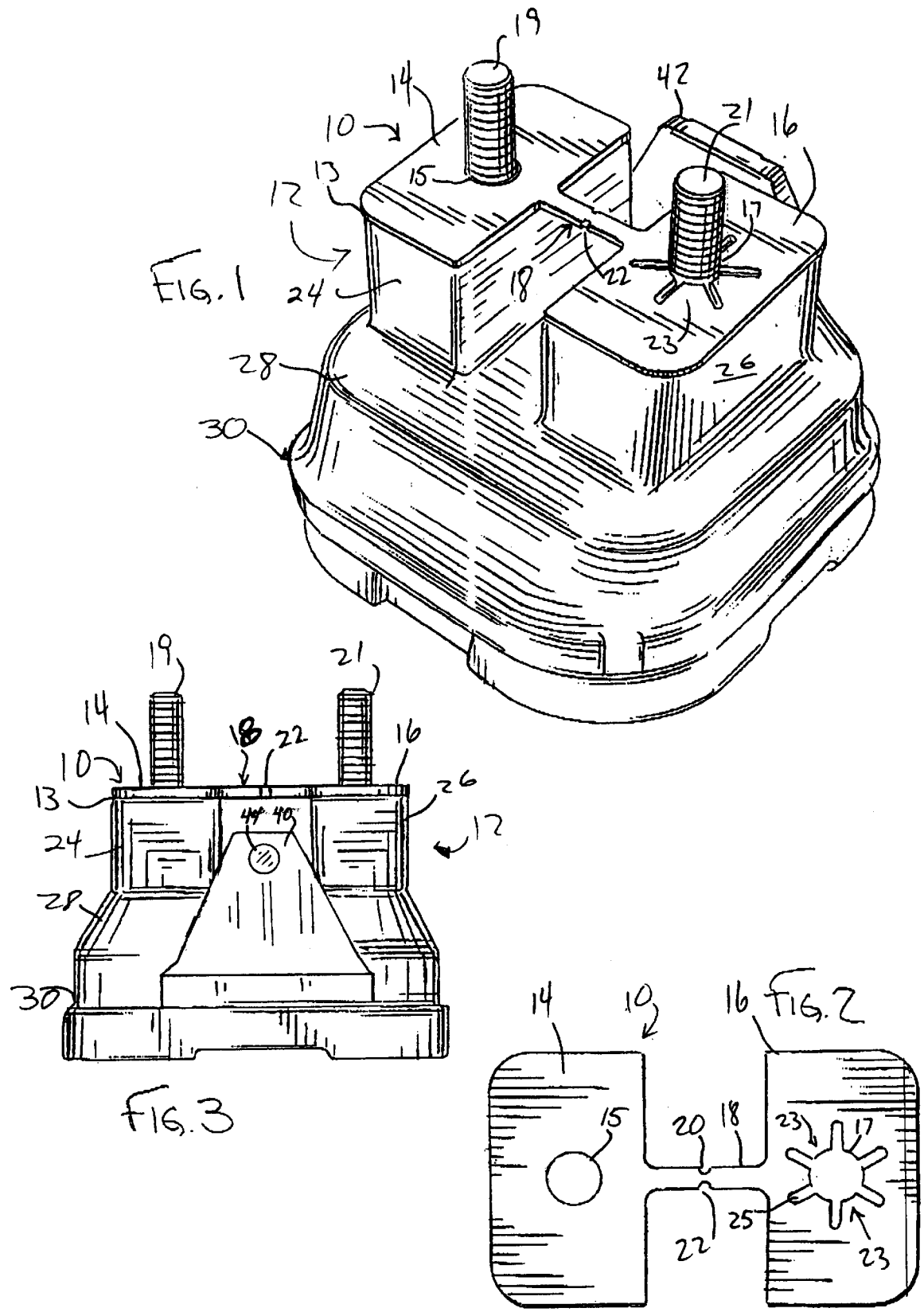

THERMAL ISOLATOR FOR VEHICLE MOUNT

TECHNICAL FIELD

The present invention relates generally to mounts for vehicle engines and/or drive trains, and degradation of the elastomeric portions of such mounts due to heat originating from an internal combustion engine or drive train of a vehicle. In particular, the present invention is directed to a thermal isolator that is located between a vehicle engine or drive train and an associated mount.

BACKGROUND OF THE INVENTION

Increasingly, modern automotive vehicles are incorporating lightweight materials. One reason for this trend is to increase various performance aspects of the vehicle. When used as frame and body members, lightweight materials provide advantages including improved gas mileage due to a reduced overall weight of the vehicle. Until recently, most engines and transmissions have been made of iron and iron alloys. In an engine application, iron components provide strength and other benefits. However, despite engineering challenges, an increasing number of engine and drive train components have been made of lightweight materials, such as aluminum. Aluminum is non-corrosive, lightweight and easily formable into complex shapes. However, compared to iron alloys, aluminum has the property of a relatively high rate of heat transfer.

The higher heat transfer from an aluminum engine can adversely affect some of the components associated with the engine and drive train. In particular, plastic or elastomeric components can be damaged. One component that is particularly vulnerable to being thermally degraded or damaged, is the engine or drive train mount. A typical engine mount includes a metal portion connected to a cradle portion of a vehicle. An aluminum or other similar metal insert of the mount is connected to the engine or transmission. Heat from the engine or transmission can degrade or damage the elastomeric portion of the mount.

As a general solution to degradation from various heat sources, such as reduced airflow to the engine compartment, some prior art mounts include a specially formulated heat-resistant rubber-based material for use as the elastomeric, vibration-absorbing material. Other mounts include a rubber cap, shield or shroud to reduce the effect of heat from the engine compartment. However, these special rubber compounds can have different performance characteristics than presently used elastomeric materials. The shrouds do not address the heat directly conducted to the mount from the engine or drive train component.

Accordingly, it would be advantageous to provide a method and apparatus for isolating the mount from heat directly conducted from an engine or drive train mounted thereto.

SUMMARY OF THE INVENTION

One aspect of the present invention provides a thermal isolator including first and second pads, the first and second pads are shaped to cover first and second leg portions of a mount. The isolator further includes a connecting portion attached to each of the first and second pads. The connecting portion is positioned to disconnect when a housing is positioned on the mount.

Other aspects of the invention provide the connecting portion with a friable portion to facilitate disconnection of the first and second pads. The friable portion of the connecting portion can include at least one notch. The thermal isolator first and second pads each include an opening formed therein to receive first and second fastener members. The first and second fastener members can be integral to the mount.

In other aspects of the invention at least one of the openings of the first and second pads has a width less than the width of a corresponding first and second fastener member sized to allow a tight fit of the at least one pad to the corresponding fastener member. The first pad may have at least one tab adjacent the first opening. The tab may be a plurality of tabs on the first pad adapted to engage the first fastener member to hold the thermal isolator in place on the mount. The plurality of tabs can be positioned radially about the first opening.

Another aspect of the invention provides an engine mount system for a vehicle including a mount including first and second leg portions, a first fastener member positioned adjacent the first leg portion and a second fastener member positioned adjacent the second leg portion, a first thermal pad positioned on the first leg portion, the first thermal pad including an opening formed therein to receive the first fastener, a second thermal pad positioned on the second leg portion, the second thermal pad including an opening formed therein to receive the second fastener and a detachable connector attached to the first pad and the second pad.

Other aspects of the invention include an engine mount system where the first leg portion is spaced apart from the second leg portion. The connector can be positioned to break upon positioning of a housing upon the mount. The connector may include at least one notch to facilitate disconnection of the first and second thermal pads. The first and second fastener members can be integral to the mount.

Another aspect of the invention includes a method of thermally insulating a mount from a housing including positioning a first pad on a first leg of the mount, positioning a second pad on a second leg of the mount, and maintaining the position of the first and second pads on the mount prior to connection of a housing upon the mount.

Other aspects of the method of the invention include the first and second pads being simultaneously positioned on the first and second legs. The method may further include receiving a first fastener member through an opening formed in the first pad, receiving a second fastener member through an opening formed in the second pad and connecting a housing to the mount. The first and second legs are permitted to move independently. The opening formed in the first pad has a width less than the width of a corresponding fastener member, and at least one tab formed adjacent to allow reception of the fastener within the first opening.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 1 is a perspective view of one embodiment of the thermal isolator of the present invention located on a mount.

FIG. 2 is a top view of the thermal isolator of FIG. 1.

FIG. 3 is a front view of the thermal isolator of FIG. 1 located on a mount.

DESCRIPTION OF THE PREFERRED EMBODIMENT

Referring to FIGS. 1–3, one embodiment of the thermal isolator 10 of the present invention is shown. The thermal isolator 10 is positioned on a mount, generally shown at 12. The thermal isolator 10 includes first and second pads 14, 16. The pads 14, 16 are preferably made of a substantially noncompressible, thermal barrier material.

A connecting portion 18 connects the first and second pads 14, 16. In this manner, the thermal isolator 10 is held in place in alignment on the mount 12 during shipping and during assembly. The connecting portion 18 has at least one notch 20. In another embodiment, the connecting portion 18 includes a pair of opposed notches 20, 22. The notches 20, 22 render the connecting portion 18 friable by permitting the connecting portion 18 to be removed by breaking. It will be understood that, in alternate embodiments, the thermal isolator 10 can include a plurality of notches (not shown) to facilitate breakage of the connecting portion 18.

The first pad 14 of the thermal isolator 10 includes an opening or hole 15 for receiving a corresponding fastener member 19. The fastener member 19 may be a threaded bolt fastened to or formed integrally with the mount 12. The second pad 16 of the thermal isolator 10 includes an opening or hole 17 for receiving a fastener member 21. One of the holes can be sized to grip a corresponding fastener member. This can be accomplished by sizing the width of the opening to be slightly smaller than the width of the fastener. This is commonly referred to as an interference fit.

A plurality of tabs may be formed around the hole in one or both of the pads. Forming slots 25 in the pad can form the tabs. The slots 25 can be formed in a radial pattern outwardly from the hole, thus, defining the tabs, as in 23. The tabs operate to grip a corresponding fastener member. The star-shaped pattern on the isolator eases manufacturability by eliminating the need of an external push nut.

The mount 12 is intended to be used to mount an engine housing (not shown), or engine component housing to a cradle portion of a vehicle (not shown). For purposes of this description, it will be understood that engine components include drive train components and transmission components. Thus, the term mount will be understood to include either an engine mount and/or a drive train mount. The term housing will be understood to include a housing of an engine block, or the like, and a power train housing, or the like.

The mount 12 includes a first elastomeric portion or leg 24 and second elastomeric portion or leg 26 which separately extend from an elastomeric block portion 28. As is known in the art, the elastomeric block portion 28 is a rubber, or the like, portion of the mount that operates to isolate vibrations of the engine from the frame of the vehicle. The elastomeric block portion 28 is affixed to a base or bracket portion 30, made of metal or like material. The base 30 is adapted to be attached to a cradle portion of a vehicle and protect the elastomeric block portion 28.

The mount shown in FIG. 3 shows a front ear portion 40 of the mount (not shown in FIG. 1 for clarity). The front ear portion 40 is connected to a rear ear portion 42, shown in FIG. 1. The front and rear ear portions 40, 42 are interconnected by an interlock pin 44.

Assembly of the system including isolator 10 and mount 12 portions includes positioning the first and second pads 14, 16 on the top surface 13 of the mount 12. The holes 15, 17 receive the fastener members 19, 21 of the mount 12. The position of the pads 14, 16 is maintained by the connecting portion 18 during assembly, shipping and assembly of a housing to the mount. In operation, the interlock pin 44 functions as a brace for maintaining the integrity of the mount during operation. In addition, the interlock pin 44 breaks the connector between the pads when the housing is fastened to the mount. This occurs when the mount is compressed by both the weight of the housing and engine and by the housing being drawn tight onto the mount by tightening bolts, or the like, onto the fastener members. In this manner, the legs 24, 26 of the mount 12 are allowed to move independently, allowing full travel of the mount 12. Otherwise, the connector, if left in place, would limit the travel of the power train causing "ground out" conditions, and degrade vehicle ride characteristics.

It can be seen that in order for an associated housing of an engine or a transmission to remain tightly affixed to the mount the thermal isolator should be made of a substantially incompressible material such as a high pressure laminated phenolic.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A thermal isolator comprising:
    first and second pads, the first and second pads shaped to cover first and second leg portions of a mount,
    a connecting portion attached to each of the first and second pads, wherein the connecting portion is positioned to disconnect the first pad from the second pad when a housing is positioned on the mount.

2. The thermal isolator of claim 1 wherein the connecting portion has a friable portion to facilitate disconnection of the first and second pads.

3. The thermal isolator of claim 2 wherein the friable portion of the connecting portion includes at least one notch.

4. The thermal isolator of claim 3 wherein the friable portion includes a pair of opposed notches.

5. The thermal isolator of claim 1 wherein the first and second pads each include an opening formed therein to receive first and second fastener members.

6. The thermal isolator of claim 5 wherein the first and second fastener members are integral to the mount.

7. The thermal isolator of claim 6 wherein at least one of the openings of the first and second pads has a width less than the width of a corresponding first and second fastener member sized to allow a tight fit of the at least one pad to the corresponding fastener member.

8. The thermal isolator of claim 7 wherein the second pad has at least one tab adjacent the second opening.

9. The thermal isolator of claim 8 wherein the at least one tab is a plurality of tabs on the second pad adapted to engage the second fastener member to hold the thermal isolator in place on the mount.

10. The thermal isolator of claim 9 wherein the plurality of tabs are positioned radially about the second opening.

11. An engine mount system for a vehicle comprising:
    a mount including elastomeric first and second leg portions;
    a first fastener member positioned adjacent the first leg portion and a second fastener member positioned adjacent the second leg portion;
    a first thermal pad positioned on the first leg portion, the first thermal pad including an opening formed therein to receive the first fastener;

a second thermal pad positioned on the second leg portion, the second thermal pad including an opening formed therein to receive the second fastener;

a detachable connector attached to the first thermal pad and the second thermal pad and;

the connector is positioned to break upon positioning of a housing upon the mount.

12. The system of claim 11 wherein the first leg portion is spaced apart from the second leg portion.

13. The system of claim 11 wherein the first and second fastener members are formed integral to the mount.

14. An engine mount system for a vehicle comprising:

a mount including elastomeric first and second leg portions;

a first fastener member positioned adjacent the first leg portion and a second fastener member positioned adjacent the second leg portion;

a first thermal pad positioned on the first leg portion, the first thermal pad including an opening formed therein to receive the first fastener;

a second thermal pad positioned on the second leg portion, the second thermal pad including an opening formed therein to receive the second fastener;

a detachable connector attached to the first thermial pad and the second thermal pad and;

the connector includes at least one notch to facilitate disconnection of the first and second thermal pads.

15. A method of thermally insulating a mount from a housing comprising:

maintaining the position of the first and second pads on the mount prior to connection of a housing upon the mount; and providing a detachable connector attached to the first pad and the second pad, wherein the connector includes at least one notch to facilitate disconnection of the first and second pads.

16. The method of claim 15 wherein the first and second pads are simultaneously positioned on the first and second legs.

17. The method of claim 15 further comprising:

receiving a first fastener member through an opening formed in the first pad;

receiving a second fastener member through an opening formed in the second pad; and connecting a housing to the mount.

18. The method of claim 17 wherein the opening formed in the second pad has a width less than the width of the second fastener member, and at least one tab formed adjacent to said opening formed in said second part to allow reception of the second fastener within said opening formed in said second part.

19. The method of claim 15 wherein the first and second legs are permitted to move independently.

20. A thermal isolator comprising:

first and second pads, the first and second pads shaped to cover first and second leg portions of a mount, a connecting portion attached to each of the first and second pads, wherein the connecting portion is positioned to disconnect the first pad from the second pad when a housing is positioned on the mount;

said connecting portion having a friable portion to facilitate disconnection of the first and second pads, and the first and second pads each include an opening formed therein to receive first and second fastener members.

* * * * *